United States Patent
Forhan et al.

(10) Patent No.: US 7,290,199 B2
(45) Date of Patent: Oct. 30, 2007

(54) METHOD AND SYSTEM FOR IMPROVED BUFFER UTILIZATION FOR DISK ARRAY PARITY UPDATES

(75) Inventors: Carl Edward Forhan, Rochester, MN (US); Robert Edward Galbraith, Rochester, MN (US); Adrian Cuenin Gerhard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/994,086

(22) Filed: Nov. 19, 2004

(65) Prior Publication Data

US 2006/0123268 A1    Jun. 8, 2006

(51) Int. Cl.
*G11C 29/00* (2006.01)
(52) U.S. Cl. .................. 714/770; 711/114; 719/325
(58) Field of Classification Search ................ 714/770; 711/114; 719/325
See application file for complete search history.

(56) References Cited

U.S. PATENT DOCUMENTS

| | | | | |
|---|---|---|---|---|
| 5,134,619 A | * | 7/1992 | Henson et al. ............ | 714/770 |
| 5,390,187 A | * | 2/1995 | Stallmo .................... | 714/7 |
| 5,499,253 A | * | 3/1996 | Lary ........................ | 714/770 |
| 6,567,891 B2 | * | 5/2003 | Oldfield et al. ............ | 711/114 |
| 6,687,872 B2 | * | 2/2004 | Oldfield et al. ............ | 714/801 |
| 7,111,227 B2 | * | 9/2006 | Oldfield et al. ............ | 714/801 |
| 2004/0049632 A1 | * | 3/2004 | Chang et al. .............. | 711/114 |

OTHER PUBLICATIONS

IBM Technical Disclosure Bulletin, vol. 38, No. 07, Jul. 1995, pp. 455-458, "Foreground/Background Checking of Parity in a Redundant Array of Independent Disks-5 Storage Subsystem" by Faunce, M. S. et al.

* cited by examiner

*Primary Examiner*—Joseph D. Torres
(74) *Attorney, Agent, or Firm*—Wood, Herron & Evans

(57) ABSTRACT

During a parity update of a parity stripe in a disk array, constant values used in finite field arithmetic are algebraically combined in order to reduce the number of buffers and steps needed to update multiple parity values when a change in data occurs. In one implementation, for example, the contents of a buffer that stores the product of a delta value associated with the change in data and a first constant, which is used to update a first parity value, are multiplied by a value representative of the ratio of a second constant, which is used to update a second parity value, and the first constant.

21 Claims, 3 Drawing Sheets

METHOD AND SYSTEM FOR IMPROVED BUFFER UTILIZATION FOR DISK ARRAY PARITY UPDATES

CROSS-REFERENCE TO RELATED APPLICATIONS

This application is related to the following U.S. patent applications all filed on even date herewith by Carl Edward Forhan, Robert Edward Galbraith and Adrian Cuenin Gerhard: Ser. No. 10/994,088, entitled "METHOD AND SYSTEM FOR ENHANCED ERROR IDENTIFICATION WITH DISK ARRAY PARITY CHECKING," Ser. No. 10/994,099, entitled "RAID ENVIRONMENT INCORPORATING HARDWARE-BASED FINITE FIELD MULTIPLIER FOR ON-THE-FLY XOR," Ser. No. 10/994,098, entitled "METHOD AND SYSTEM FOR INCREASING PARALLELISM OF DISK ACCESSES WHEN RESTORING DATA IN A DISK ARRAY SYSTEM," and Ser. No. 10/994,097, entitled "METHOD AND SYSTEM FOR RECOVERING FROM ABNORMAL INTERRUPTION OF A PARITY UPDATE OPERATION IN A DISK ARRAY SYSTEM." Each of these applications is incorporated by reference herein.

FIELD OF THE INVENTION

The present invention relates to data protection methods for data storage and, more particularly, to systems implementing RAID-6 and similar data protection and recovery strategies.

BACKGROUND OF THE INVENTION

RAID stands for Redundant Array of Independent Disks and is a taxonomy of redundant disk array storage schemes which define a number of ways of configuring and using multiple computer disk drives to achieve varying levels of availability, performance, capacity and cost while appearing to the software application as a single large capacity drive. Typical RAID storage subsystems can be implemented in either hardware or software. In the former instance, the RAID algorithms are packaged into separate controller hardware coupled to the computer input/output ("I/O") bus and, although adding little or no central processing unit ("CPU") overhead, the additional hardware required nevertheless adds to the overall system cost. On the other hand, software implementations incorporate the RAID algorithms into system software executed by the main processor together with the operating system, obviating the need and cost of a separate hardware controller, yet adding to CPU overhead.

Various RAID levels have been defined from RAID-0 to RAID-6, each offering tradeoffs in the previously mentioned factors. RAID-0 is nothing more than traditional striping in which user data is broken into chunks which are stored onto the stripe set by being spread across multiple disks with no data redundancy. RAID-1 is equivalent to conventional "shadowing" or "mirroring" techniques and is the simplest method of achieving data redundancy by having, for each disk, another containing the same data and writing to both disks simultaneously. The combination of RAID-0 and RAID-1 is typically referred to as RAID-0+1 and is implemented by striping shadow sets resulting in the relative performance advantages of both RAID levels. RAID-2, which utilizes Hamming Code written across the members of the RAID set is not now considered to be of significant importance.

In RAID-3, data is striped across a set of disks with the addition of a separate dedicated drive to hold parity data. The parity data is calculated dynamically as user data is written to the other disks to allow reconstruction of the original user data if a drive fails without requiring replication of the data bit-for-bit. Error detection and correction codes ("ECC") such as Exclusive-OR ("XOR") or more sophisticated Reed-Solomon techniques may be used to perform the necessary mathematical calculations on the binary data to produce the parity information in RAID-3 and higher level implementations. While parity allows the reconstruction of the user data in the event of a drive failure, the speed of such reconstruction is a function of system workload and the particular algorithm used.

As with RAID-3, the RAID scheme known as RAID-4 consists of N data disks and one parity disk wherein the parity disk sectors contain the bitwise XOR of the corresponding sectors on each data disk. This allows the contents of the data in the RAID set to survive the failure of any one disk. RAID-5 is a modification of RAID-4 which stripes the parity across all of the disks in the array in order to statistically equalize the load on the disks.

The designation of RAID-6 has been used colloquially to describe RAID schemes that can withstand the failure of two disks without losing data through the use of two parity drives (commonly referred to as the "P" and "Q" drives) for redundancy and sophisticated ECC techniques. Although the term "parity" is used to describe the codes used in RAID-6 technologies, the codes are more correctly a type of ECC code rather than simply a parity code. Data and ECC information are striped across all members of the RAID set and write performance is generally lower than with RAID-5 because three separate drives must each be accessed twice during writes. However, the principles of RAID-6 may be used to recover a number of drive failures depending on the number of "parity" drives that are used.

Some RAID-6 implementations are based upon Reed-Solomon algorithms, which depend on Galois Field arithmetic. A complete explanation of Galois Field arithmetic and the mathematics behind RAID-6 can be found in a variety of sources and, therefore, only a brief overview is provided below as background. The Galois Field arithmetic used in these RAID-6 implementations takes place in $GF(2^N)$. This is the field of polynomials with coefficients in $GF(2)$, modulo some generator polynomial of degree N. All the polynomials in this field are of degree N-1 or less, and their coefficients are all either 0 or 1, which means they can be represented by a vector of N coefficients all in $\{0,1\}$; that is, these polynomials "look" just like N-bit binary numbers. Polynomial addition in this Field is simply N-bit XOR, which has the property that every element of the Field is its own additive inverse, so addition and subtraction are the same operation. Polynomial multiplication in this Field, however, can be performed with table lookup techniques based upon logarithms or with simple combinational logic.

Each RAID-6 check code (i.e., P and Q) expresses an invariant relationship, or equation, between the data on the data disks of the RAID-6 array and the data on one or both of the check disks. If there are C check codes and a set of F disks fail, $F \leq C$, the failed disks can be reconstructed by selecting F of these equations and solving them simultaneously in $GF(2^N)$ for the F missing variables. In the RAID-6 systems implemented or contemplated today there are only 2 check disks—check disk P, and check disk Q. It is worth noting that the check disks P and Q change for each stripe of data and parity across the array such that parity data is not written to a dedicated disk but is, instead, striped across all the disks.

Even though RAID-6 has been implemented with varying degrees of success in different ways in different systems, there remains an ongoing need to improve the efficiency and costs of providing RAID-6 protection for data storage. The mathematics of implementing RAID-6 involve complicated calculations that are also repetitive. Accordingly, efforts to improve the simplicity of circuitry, the cost of circuitry and the efficiency of the circuitry needed to implement RAID-6 remains a priority today and in the future.

For example, one drawback with conventional RAID-6 designs relates to the throughput of parity updates in such designs due to comparatively higher buffer requirements for performing such updates. A parity update, in this context, refers to updating the parity information stored in a given parity stripe in a disk array in response to a change in the data stored in the parity stripe.

By way of comparison, in a RAID-5 design, a parity update operation typically requires, first, that the old data to be updated be retrieved from the appropriate disk and compared to the new data to calculate a delta value $\Delta$, e.g., by performing an exclusive-OR (XOR) operation with the old and new data. This delta value $\Delta$ is then used to update the parity, e.g., by performing an XOR operation with the old parity value and the delta value $\Delta$.

Of note, the two XOR operations performed during a RAID-5 parity update can be implemented using only two buffers. Specifically, a first buffer can be used to initially store the new data to be written, with a second buffer used to store the delta value $\Delta$ generated from the XOR of the new data stored in the first buffer and old data retrieved from the appropriate disk (which can be fed directly to XOR logic, and thus does not need to be buffered). Once the new data is written to the appropriate disk, the first buffer can then be reused to store the result of the XOR operation between the delta value $\Delta$ stored in the second buffer and the old parity value retrieved from the appropriate disk (which also can be fed directly to XOR logic without buffering). After this second XOR operation, the first buffer stores the new parity value, which can then be read out of the first buffer and written to the appropriate disk.

On the other hand, in a RAID-6 environment, where two disks include parity data for each parity stripe, parity update operations typically require at least one additional buffer to store interim data associated with such operations. In particular, while RAID-6 parity updates still require the calculation of a delta value $\Delta$, updating both of the parity values for a given parity stripe require that the delta value $\Delta$ be multiplied or scaled by different constants that are respectively associated with the different parity stripe equations that relate the parity values to the data in the parity stripe equation. These different constants are conventionally designated as constants $K_1$ and $K_2$, and as such, one parity value P for a parity stripe is typically calculated by performing an XOR of the old parity value P and the product of constant $K_1$ and delta value $\Delta$ (i.e., $K_1\Delta$), while the other parity value Q for the same parity stripe is typically calculated by performing an XOR of the old parity value Q and the product of constant $K_2$ and delta value $\Delta$ (i.e., $K_2\Delta$).

In a conventional RAID-6 implementation, three or more buffers are used, with a first buffer initially storing the new data to be written, and with a second buffer used to store the delta value $\Delta$ generated from the XOR of the new data stored in the first buffer and old data retrieved from the appropriate disk. Since the delta value $\Delta$ is required for both parity values, a third buffer is used to store the product $K_1\Delta$ of the delta value $\Delta$ stored in the second buffer and constant $K_1$. Also, similar to a RAID-5 implementation, after the new data is written to the appropriate disk, the first buffer is reused to store the result of an XOR operation between the product $K_1\Delta$ stored in the third buffer and the old parity value P retrieved from the appropriate disk, which result is then written back out to the appropriate disk as the new parity value P. To update parity value Q, after the parity value P is updated, the third buffer is then reused to store the product $K_2\Delta$ of the delta value $\Delta$ stored in the second buffer and constant $K_2$, and the first buffer is then reused to store the result of an XOR operation between the product $K_2\Delta$ now stored in the third buffer and the old parity value Q retrieved from the appropriate disk. This result, now stored in the first buffer, is then written back out to the appropriate disk as the new parity value Q.

Utilizing three buffers for a RAID-6 parity update, however, increases buffer requirements by 50% over the two buffers required for RAID-5 designs. As a result, in situations where the number of buffers is constrained, a RAID-6 design typically can have only $\tfrac{2}{3}^{rd}$ the number of parity update operations in progress in comparison to a RAID-5 design, thus reducing throughput and limiting overall performance.

SUMMARY OF THE INVENTION

The invention addresses these and other problems associated with the prior art by algebraically combining multiple constant values used in updating multiple parity values for a parity stripe such that a product used in the generation of one parity value is effectively derived from the product used in the generation of the other parity value. By doing so, the delta value that is common to both products need not be separately stored in a buffer to calculate each product, thus eliminating the need for such a buffer. As a result, parity updates made to multiple parity values may be performed with a reduced number of required buffers, thus limiting the potential bottlenecks associated with the buffers, and improving overall throughput and performance.

By way of example, in one exemplary RAID-6 implementation consistent with the invention, where P and Q parity values are calculated by XOR'ing old P and Q values with separate products $K_1\Delta$ and $K_2\Delta$, the product $K_2\Delta$ is derived from the product $K_1\Delta$ by multiplying the product $K_1\Delta$ by a value (designated herein as $K_3$) representative of the ratio of $K_2$ and $K_1$ (i.e., $K_2/K_1$). As a result, the need for a separate buffer to store the delta value $\Delta$ for use in calculating each of the products $K_1\Delta$ and $K_2\Delta$ is eliminated.

Therefore, consistent with the invention, parity values for a parity stripe in a disk array are updated in association with storing new data in the parity stripe, where the disk array is of the type where the parity stripe includes at least first and second parity values related to data stored in the parity stripe by at least one parity stripe equation, and where the first parity value is capable of being updated based upon the new data using a first constant derived from the at least one parity stripe equation, and the second parity value is capable of being updated based upon the new data using a second constant derived from the at least one parity stripe equation. The parity values are updated by storing in a first buffer a first value representative of a product of the first constant and a delta value representative of a difference between the new data and old data previously stored in the parity stripe, updating the first parity value using the first value stored in the first buffer, storing in a second buffer a second value representative of a product of the first value stored in the first buffer and a third constant representative of a ratio of the second constant to the first constant, and updating the second parity value using the second value stored in the second buffer.

DETAILED DESCRIPTION

Figure 1:
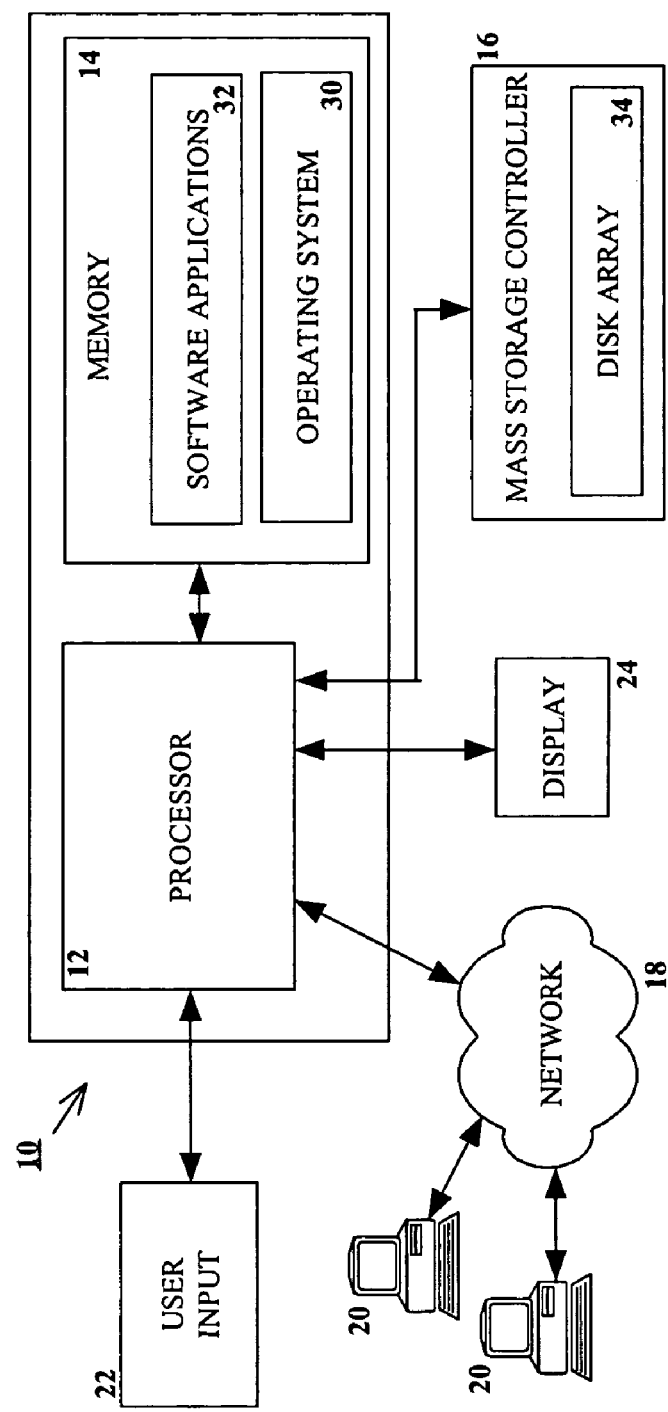
FIG. 1 is a block diagram of an exemplary computer system that can implement a RAID-6 storage controller in accordance with the principles of the present invention.

The embodiments discussed hereinafter reduce the number of buffers required to perform parity updates in RAID-6 and similar environments by algebraically combining multiple constant values used in updating multiple parity values for a parity stripe such that a product used in the generation of one parity value is effectively derived from the product used in the generation of the other parity value. By doing so, the need to separately store a delta value, representative of the difference between new and old data in a parity stripe, is often eliminated, thus reducing buffer requirements and improving performance.

Presented hereinafter are a number of embodiments of a disk array environment implementing the parity update operations consistent with the invention. However, prior to discussing such embodiments, a brief background on RAID-6 is provided, followed by a description of an exemplary hardware environment within which parity update operations consistent with the invention may be implemented.

General RAID-6 Background

The nomenclature used herein to describe RAID-6 storage systems conforms to the most readily accepted standards for this field. In particular, there are N drives of which any two are considered to be the parity drives, P and Q. Using Galois Field arithmetic, two independent equations can be written:

$$\alpha^0 d_0 + \alpha^0 d_1 + \alpha^0 d_2 + \ldots + \alpha^0 d_{N-1} = 0 \quad (1)$$

$$\alpha^0 d_0 + \alpha^1 d_1 + \alpha^2 d_2 + \ldots + \alpha^{N-1} d_{N-1} = 0 \quad (2)$$

where the "+" operator used herein represents an Exclusive-OR (XOR) operation.

In these equations, $\alpha^x$ is an element of the finite field and $d_x$ is data from the $x^{th}$ disk. While the P and Q disk can be any of the N disks for any particular stripe of data, they are often noted as $d_P$ and $d_Q$. When data to one of the disks (i.e., $d_X$) is updated, the above two equations resolve to:

$$\Delta = (\text{old } d_X) + (\text{new } d_x) \quad (3)$$

$$(\text{new } d_P) = (\text{old } d_P) + ((\alpha^Q + \alpha^X)/(\alpha^P + \alpha^Q))\Delta \quad (4)$$

$$(\text{new } d_Q) = (\text{old } d_Q) + ((\alpha^P + \alpha^X)/(\alpha^P + \alpha^Q))\Delta \quad (5)$$

In each of the last two equations the term to the right of the addition sign is a constant multiplied by the change in the data (i.e., $\Delta$). These terms in equations (4) and (5) are often denoted as $K_1\Delta$ and $K_2\Delta$, respectively.

In the case of one missing, or unavailable drive, simple XOR'ing can be used to recover the drive's data. For example, if $d_1$ fails then $d_1$ can be restored by $$d_1 = d_0 + d_2 + d_3 + \ldots \quad (6)$$

In the case of two drives failing, or being "exposed", the above equations can be used to restore a drive's data. For example, given drives 0 through X and assuming drives A and B have failed, the data for either drive can be restored from the remaining drives. If for example, drive A was to be restored, the above equations reduce to:

$$d_A = ((\alpha^B + \alpha^0)/(\alpha^B + \alpha^A))d_0 + ((\alpha^B + \alpha^1)/(\alpha^B + \alpha^A))d_1 + \ldots$$
$$+ ((\alpha^B + \alpha^X)/(\alpha^B + \alpha^A))d_X \quad (7)$$

Exemplary Hardware Environment

With this general background of RAID-6 in mind, attention can be turned to the drawings, wherein like numbers denote like parts throughout the several views. FIG. 1 illustrates an exemplary computer system in which a RAID-6, or other disk array, may be implemented. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on the disk array 34 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices accessed via a storage controller, or adapter, 16, e.g., removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

In accordance with the principles of the present invention, the mass storage controller 16 advantageously implements RAID-6 storage protection within an array of disks 34.

Computer 10 operates under the control of an operating system 30, and executes or otherwise relies upon various computer software applications, components, programs, objects, modules, data structures, etc. (e.g., software applications 32). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
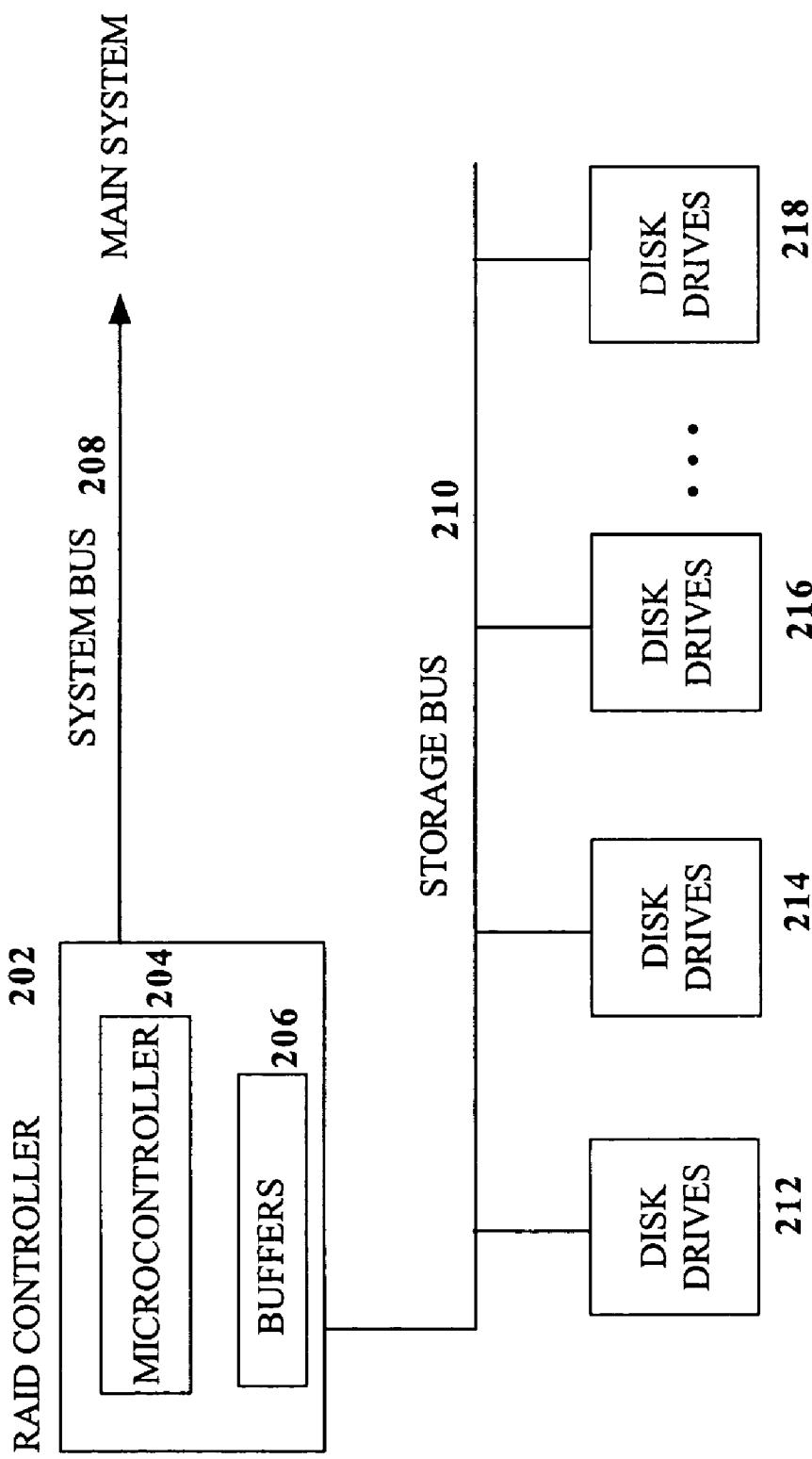
FIG. 2 is a block diagram illustrating the principal components of a RAID controller of FIG. 1.

FIG. 2 illustrates a block diagram of the control subsystem of a disk array system, e.g., a RAID-6 compatible system. In particular, the mass storage controller 16 of FIG. 1 is shown in more detail to include a RAID controller 202 that is coupled through a system bus 208 with the processor 12 and through a storage bus 210 to various disk drives 212-218. As known to one of ordinary skill, these buses may be proprietary in nature or conform to industry standards such as SCSI-1, SCSI-2, etc. The RAID controller includes a microcontroller 204 that executes program code that implements the RAID-6 algorithm for data protection, and that is typically resident in memory located in the RAID controller. In particular, data to be stored on the disks 212-218 is used to generate parity data and then broken apart and striped across the disks 212-218. The disk drives 212-218 can be individual disk drives that are directly coupled to the controller 202 through the bus 210 or may include their own disk drive adapters that permit a string a individual disk drives to be connected to the storage bus 210. In other words, a disk drive 212 may be physically implemented as 4 or 8 separate disk drives coupled to a single controller connected to the bus 210. As data is exchanged between the disk drives 212-218 and the RAID controller 202, in either direction, buffers 206 are provided to assist in the data transfers. The utilization of the buffers 206 can sometimes produce a bottle neck in data transfers and the inclusion of numerous buffers may increase cost, complexity and size of the RAID controller 202. Thus, certain embodiments of the present invention relate to provision and utilizing these buffers 206 in an economical and efficient manner.

It will be appreciated that the embodiment illustrated in FIGS. 1 and 2 is merely exemplary in nature. For example, it will be appreciated that the invention may be applicable to other disk array environments where multiple parity values are associated with each parity stripe. It will also be appreciated that a disk array environment consistent with the invention may utilize a completely software-implemented control algorithm resident in the main storage of the computer, or that some functions handled via program code in a computer or controller can be implemented in hardware logic circuits, and vice versa. Therefore, the invention should not be limited to the particular embodiments discussed herein.

Buffer Reduction For RAID-6 Parity Updates

In a RAID-6 system, six I/O operations are generated for every normal parity update. These I/O operations can be summarized as:
 1) read an old data, $d_x$ from a disk;
 2) write new data, $d_x$ to the disk;
 3) read old parity, $d_P$ from a disk;
 4) write new parity, $d_P$ to the disk;
 5) read old parity, $d_Q$ from a disk, and
 6) write new parity, $d_Q$ to the disk.

The new data and parity values are calculated according to the equations (3), (4) and (5). Typically, these operations require a number of buffers as shown in Table I below. The column refers to three different buffers A, B, C and the rows are different sequential steps of the operation of updating the parity.

TABLE I

| Buffer A | Buffer B | Buffer C |
|---|---|---|
| get new data, $d_x$ | | |
| | $\Delta = (\text{old } d_X) + A$ | |
| Write new data, $d_x$ | | |
| | | $K_1 \Delta = K_1 * B$ |
| | | $d_P = (\text{old } d_P) + C$ |
| | | Write new parity, $d_P$ |
| | | $K_2 \Delta = K_2 * B$ |
| | | $d_Q = (\text{old } d_Q) + C$ |
| | | write new parity, $d_Q$ |

In the above table, the addition (or XOR) steps are performed via an XOR engine in which data that is not in a buffer is read directly from a drive into the XOR engine. Compared to RAID-5, the parity update of RAID-6 utilizes additional buffers and, therefore, performs at about ⅔ the throughput in a buffer constrained environment.

Accordingly embodiments of the present invention include a different buffer arrangement that improves throughput of the parity update operation in a RAID-6 environment. In particular, rather than keep the delta value $\Delta$ in buffer B the entire time, simple algebra may be used to calculate the delta value $\Delta$ when generating new parity, $d_Q$. Table II shown below, which represents a modification of Table I, illustrates how the values or products $K_1\Delta$ and $K_2\Delta$ (refer to equations (4) and (5)) can be manipulated to reduce the reliance on buffers in RAID-6 parity updates.

TABLE II

| Buffer A | Buffer B | Buffer C |
|---|---|---|
| get new data, $d_x$ | | |
| | $\Delta$ = (old $d_X$) + A | |
| write new data, $d_x$ | | NOT |
| $K_1 \Delta = K_1 * B$ | | USED |
| | $d_P$ = (old $d_P$) + A | |
| | write new parity, $d_P$ | |
| | $K_2 \Delta = K_3 * A$ | |
| $d_Q$ = (old $d_Q$) + B | | |
| write new parity, $d_Q$ | | |

As can be seen from the table, a value $K_3$ is defined and stored such that $K_3=K_2/K_1$. When the value $K_3$ is multiplied with the product $K_1\Delta$, the result is equal to $K_2\Delta$. Thus, by simple algebraic manipulation according to the above table, the RAID-6 parity update is accomplished using only two buffers, which will be appreciated can increase performance and throughput by limiting bottlenecks due to constrained buffer requirements.

Figure 3:
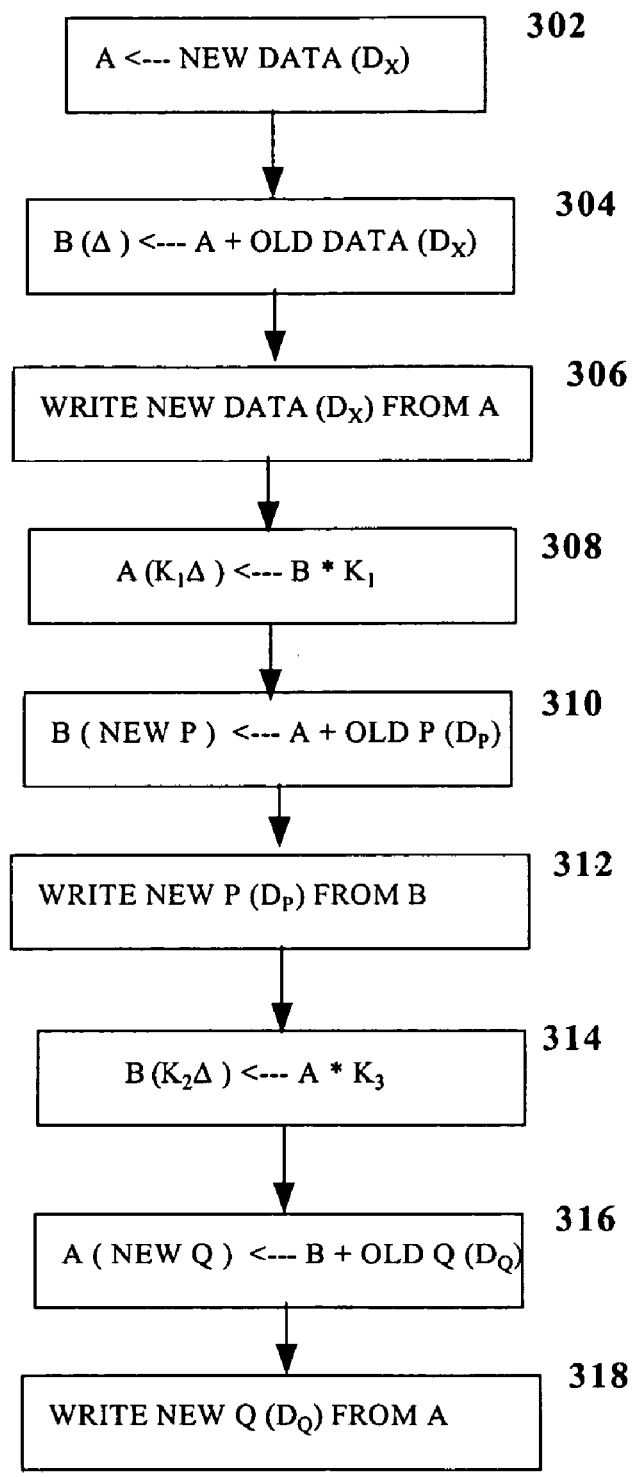
FIG. 3 is a flowchart of an exemplary parity update operation consistent with the invention.

FIG. 3 illustrates, similar to Table II, the steps involved in performing a parity update operation in an exemplary RAID-6 environment. In step 302, the new data for disk $d_x$ is retrieved into buffer A, and in step 304, the delta value $\Delta$ is calculated by XOR'ing the old data retrieved from disk $d_x$ with the contents of buffer A, and stored in buffer B. In step 306, the new data is written from buffer A to disk $d_x$, and in step 308, the first value or product $K_1\Delta$ is calculated by multiplying the contents of buffer B by the constant $K_1$, and stored in buffer A.

In step 310, the new parity P is calculated by XOR'ing the old parity P retrieved from disk $d_P$ with the contents of buffer A, and in step 312, the new parity P is written to disk $d_P$. Then, in step 314, the second value or product $K_2\Delta$ is calculated by multiplying the contents of buffer A by the constant $K_3$, which is set to equal $K_2/K_1$, and stored in buffer B. Then, in step 316, the new parity Q is calculated by XOR'ing the old parity Q retrieved from disk $d_Q$ with the contents of buffer B, and in step 318, the new parity Q is written to disk $d_Q$. The parity update operation is then complete.

Thus, embodiments of the present invention provide a method and system, within a RAID-6 or similar environment where multiple parity values are associated with each parity stripe, that perform parity updates utilizing a reduced number of buffers. Various modifications may be made to the illustrated embodiments without departing from the spirit and scope of the invention. Therefore, the invention lies in the claims hereinafter appended.

What is claimed is:

1. A method for updating parity values in a disk array in association with storing new data in a parity stripe, wherein the disk array is of the type wherein the parity stripe includes at least first and second parity values related to data stored in the parity stripe by at least one parity stripe equation, wherein the first parity value is capable of being updated based upon the new data using a first constant derived from the at least one parity stripe equation, and wherein the second parity value is capable of being updated based upon the new data using a second constant derived from the at least one parity stripe equation, the method comprising:

storing in a first buffer a first value representative of a product of the first constant and a delta value representative of a difference between the new data and old data previously stored in the parity stripe;

updating the first parity value using the first value stored in the first buffer;

storing in a second buffer a second value representative of a product of the first value stored in the first buffer and a third constant representative of a ratio of the second constant to the first constant; and updating the second parity value using the second value stored in the second buffer.

2. The method of claim 1, further comprising:

generating the delta value; and updating the parity stripe with the new data.

3. The method of claim 2, further comprising storing the delta value in the second buffer prior to storing the first value in the first buffer, wherein storing the first value in the first buffer includes retrieving the delta value from the second buffer and multiplying the delta value by the first constant.

4. The method of claim 2, wherein generating the delta value comprises XOR'ing the new and old data for the parity stripe.

5. The method of claim 1, wherein updating the first parity value comprises XOR'ing the first parity value with the first value stored in the first buffer.

6. The method of claim 1, wherein updating the second parity value comprises XOR'ing the second parity value with the second value stored in the second buffer.

7. The method of claim 1, wherein updating the first parity value is performed before storing the second value in the second buffer.

8. The method of claim 1, wherein the first and second constants are finite field constants.

9. The method of claim 1, wherein the disk array comprises a RAID-6 disk array.

10. An apparatus comprising:

first and second buffers; and a disk array controller coupled to the first and second buffers and configured to update parity values in a disk array in association with storing new data in a parity stripe, wherein the disk array is of the type wherein the parity stripe includes at least first and second parity values related to data stored in the parity stripe by at least one parity stripe equation, wherein the first parity value is capable of being updated based upon the new data using a first constant derived from the at least one parity stripe equation, wherein the second parity value is capable of being updated based upon the new data using a second constant derived from the at least one parity stripe equation, and wherein the disk array controller is configured to store in the first buffer a first value representative of a product of the first constant and a delta value representative of a difference between the new data and old data previously stored in the parity stripe, update the first parity value using the first value stored in the first buffer, store in the second buffer a second value representative of a product of the first value stored in the first buffer and a third constant representative of a ratio of the second constant to the first constant, and update the second parity value using the second value stored in the second buffer.

11. The apparatus of claim 10, wherein the disk array controller comprises a RAID-6 controller.

12. The apparatus of claim 10, wherein the disk array controller comprises program code configured to perform at least one of storing the first value in the first buffer, updating the first parity value, storing the second value in the second buffer and updating the second parity value.

13. The apparatus of claim 10, further comprising a plurality of disks coupled to the disk array controller.

14. The apparatus of claim 10, wherein the disk array controller is further configured to generate the delta value and update the parity stripe with the new data.

15. The apparatus of claim 14, wherein the disk array controller is further configured to store the delta value in the second buffer prior to storing the first value in the first buffer, and wherein the disk array controller is configured to store the first value in the first buffer by retrieving the delta value from the second buffer and multiplying the delta value by the first constant.

16. The apparatus of claim 14, wherein the disk array controller is configured to generate the delta value by XOR'ing the new and old data for the parity stripe.

17. The apparatus of claim 10, wherein the disk array controller is configured to update the first parity value by XOR'ing the first parity value with the first value stored in the first buffer.

18. The apparatus of claim 10, wherein the disk array controller is configured to update the second parity value by XOR'ing the second parity value with the second value stored in the second buffer.

19. The apparatus of claim 10, wherein the disk array controller is configured to update the first parity value before storing the second value in the second buffer.

20. The apparatus of claim 10, wherein the first and second constants are finite field constants.

21. A program product comprising:
program code configured upon execution to update parity values in a disk array in association with storing new data in a parity stripe, wherein the disk array is of the type wherein the parity stripe includes at least first and second parity values related to data stored in the parity stripe by at least one parity stripe equation, wherein the first parity value is capable of being updated based upon the new data using a first constant derived from the at least one parity stripe equation, wherein the second parity value is capable of being updated based upon the new data using a second constant derived from the at least one parity stripe equation, and wherein the program code is configured to store in a first buffer a first value representative of a product of the first constant and a delta value representative of a difference between the new data and old data previously stored in the parity stripe, update the first parity value using the first value stored in the first buffer, store in a second buffer a second value representative of a product of the first value stored in the first buffer and a third constant representative of a ratio of the second constant to the first constant, and update the second parity value using the second value stored in the second buffer; and
a recordable type media storing the program code.

* * * * *